United States Patent [19]

Jansen et al.

[11] Patent Number: 5,063,397

[45] Date of Patent: Nov. 5, 1991

[54] VARIABLE-THICKNESS IMAGING MEMBERS

[75] Inventors: Frank Jansen; Inan Chen, both of Webster, N.Y.

[73] Assignee: Xerox Corporation, Stamford, Conn.

[21] Appl. No.: 528,874

[22] Filed: May 25, 1990

[51] Int. Cl.[5] ........................ G01D 15/06; G01D 9/00; G03G 15/06

[52] U.S. Cl. .............................. 346/153.1; 346/135.1; 355/245

[58] Field of Search ............................. 346/150-160.1, 346/135.1; 355/275, 281, 77, 245

[56] References Cited

U.S. PATENT DOCUMENTS 3,121,006 2/1964 Middleton et al. .
3,357,989 12/1967 Byrne et al. .
3,442,781 5/1969 Weinberger .
3,474,019 10/1969 Krieger et al. ........................ 355/3
3,866,572 2/1975 Gundlach .............................. 355/3
4,415,639 11/1983 Horgan .
4,758,486 7/1988 Yamazaki et al. .
4,772,253 9/1988 Koizumi et al. .

FOREIGN PATENT DOCUMENTS 62-156682 7/1987 Japan .

*Primary Examiner*—George H. Miller, Jr.
*Attorney, Agent, or Firm*—Oliff & Berridge

[57] ABSTRACT

A method and apparatus for developing an image wherein a distance between a charge receiving surface and a conductive surface is varied. During charging of the charge receiving surface, the receptor thickness is smaller than during the development step.

25 Claims, 1 Drawing Sheet

VARIABLE-THICKNESS IMAGING MEMBERS

BACKGROUND OF THE INVENTION

This invention is directed generally to ionography and electrophotography, and more specifically is directed to electroreceptors and photoreceptors which can provide different preferred dimensional characteristics for latent image-forming and for subsequent developing of the latent images.

Numerous different members have been proposed for imaging processes. These members include electrophotographic image forming members used in electrophotography and electroreceptors used in ionography. In electrophotography, an electrophotographic plate containing a photoconductive insulating layer on a conductive layer is imaged by first uniformly electrostatically charging its surface. The plate is then exposed to a pattern of activating electromagnetic radiation such as light. The radiation selectively dissipates the charge in the illuminated areas of the photoconductive insulating layer while leaving behind an electrostatic latent image in the non-illuminated areas. This electrostatic latent image may then be developed to form a visible image by depositing finely divided electroscopic marking particles on the surface of the photoconductive insulating layer. The resulting visible image may then be transferred from the electrophotographic plate to a support such as paper. This imaging process may be repeated many times with reusable photoconductive insulating layers.

In ionography, a latent image is created by writing on the surface of the imaging member with an ion head. The imaging member is preferably electrically insulating so that the charge applied by the ion head does not disappear prior to development. Therefore, ionographic receivers possess negligible, if any, photosensitivity. The absence of photosensitivity provides considerable advantages in ionographic applications. For example, the electroreceptor enclosure does not have to be completely impermeable to light and radiant fusing can be used without having to shield the receptor from stray radiation. Also, the level of dark decay in these ionographic receivers is characteristically low, thus providing a constant voltage profile on the receiver surface over extended time periods.

Electroreceptors are useful in ionographic imaging and printing systems such as those commercially available as the Xerox Corporation 4060 and 4075, which utilize an electrically resistive dielectric image receiver, i.e., an electroreceptor. In one simple form of the systems, latent images are formed by depositing ions in a prescribed pattern onto the electroreceptor surface with a linear array of ion emitting devices or ion heads, creating a latent electrostatic image. Charged toner particles are then passed over these latent images causing the toner particles to remain where a charge has previously been deposited. This developed image is sequentially transferred to a substrate such as paper, and permanently affixed thereto.

SUMMARY OF THE INVENTION

It is an object of the invention to provide an imaging member which overcomes the shortcomings of the prior art.

It is an object of the invention to provide an imaging member which overcomes the problems associated with image blurring.

It is another object of the invention to obtain very high development voltages with very thin electroreceptor and electrophotographic imaging members.

In accordance with the present invention, there is provided an imaging member wherein the distance from the outer surface of the dielectric member to the conductive article at the development stage is different from that at the latent image-forming stage.

One embodiment of the invention comprises a roller having a conductive surface, a dielectric flexible belt supported by the conductive roller, and a spacer means in contact with the dielectric belt. The spacer means comprises a layer of a dielectric material in contact with the dielectric material of the flexible belt, and has a conductive backing layer. During charging and image formation, the distance between an outer imaging surface of the dielectric belt and the outer surface of the conductive roller is smaller than the distance between the outer surface of the dielectric belt and the conductive backing layer during development. In use, the present invention facilitates minimizing the electric field during writing (e.g., increasing the electric field during development).

BRIEF DESCRIPTION OF THE DRAWINGS

A more complete understanding of the present invention can be obtained by reference to the accompanying drawings, wherein.

DESCRIPTION OF PREFERRED EMBODIMENTS

Figure 1:
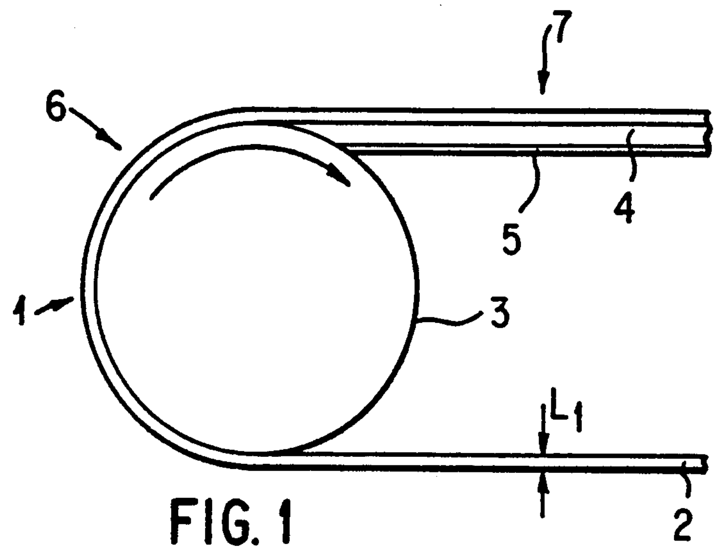
FIG. 1 is a cross-sectional view of one embodiment of an electroreceptor of the invention.

In electroreceptors and photoreceptors, it is necessary to receive charge from a source, and to present this charge against an electrode for development. The processes of charge reception and image development pose conflicting requirements for the construction and materials of the electroreceptor. For example, charging imposes the requirement of low electric field above the electroreceptor in order to minimize the "blooming" of charge. Blooming of charge is an inherent disadvantage of ionographic imaging processes. Ions are applied to the imaging surface to create a latent image, and during the charging process the ionic charge on the surface of the imaging member repels the incoming charge. As more ions are applied, this repulsion between surface charge and arriving charge ultimately results in a blurred image. This effect is known as blooming. Therefore, it is desirable to minimize the external field caused by the ions applied to the imaging surface. Image development, on the other hand, requires a high electric field above the electroreceptor surface.

The present invention decouples the charging and development process requirements of an electroreceptor. An image is formed on a charge receiver (electroreceptor) by applying relatively few ions, which keeps the surface charge density of the charge receiver small. Since fewer ions are applied, image blooming caused by the ions repelling each other is reduced or eliminated. To develop the applied latent image, the development voltage of the electroreceptor is preferably increased.

Increasing the development voltage of the electroreceptor in the present invention is facilitated by increasing the thickness of the electroreceptor. The development voltage is equal to the product of the surface charge density and the thickness of the electroreceptor, divided by the dielectric constant of the electroreceptor material. Thus, for a given surface charge density, which is determined by the number of ions applied to form the latent image, the development voltage can be increased by increasing the thickness of the electroreceptor.

The field above the electroreceptor, normal to the surface is given by $$E=\sigma/\epsilon_0\,[k_1L_2/L_1+k_2]$$

where $\sigma$ is the surface charge density; $k_1$ and $k_2$ are the dielectric constants of the electroreceptor and the medium above the surface, respectively; $L_1$ is the thickness of the receptor; $L_2$ is the distance from the surface to the ion source (or the counter electrode), and $\epsilon_0$ is the permittivity of vacuum. According to this equation, it can be seen that during the charging (imaging) step, when a low field is preferred, the receptor thickness $L_1$ should be small. On the other hand, at the development step, when a high field is preferred, the receptor thickness should be large.

It is to be noted that the present invention is not limited to electroreceptors, but can also be used in conjunction with electrophotographic imaging members and the like. A more complete understanding of the invention will be made hereinafter with particular reference to an embodiment of an electroreceptor.

An embodiment of an electroreceptor of the present invention is shown in FIG. 1. An electroreceptor 1 is comprised of a flexible dielectric belt 2 which has no electrode of its own. The belt 2 is supported by a conductive roller or drum 3 comprising a support which has a conductive surface. The conductive surface of the roller or metal drum 3 functions as a back electrode during charging/imaging. The electroreceptor 1 further comprises a spacer means 4 which supports the electroreceptor belt 2 as it passes from the drum 3. The spacer means 4 comprises a dielectric support which has a conductive surface 5 which functions as a counter-electrode during development of the image on the dielectric belt 2. In other words, charging/imaging of the electroreceptor takes place at, for example, position 6, when the distance between the outside surface of the electroreceptor belt and the conductive surface of the drum 3 is small. The distance between the outside surface of the electroreceptor belt and the conductive back surface 5 of the belt 2 is larger during development, for example, at position 7, because of the spacer means 4. By increasing the distance between the conductive . surface and the outer surface of the electroreceptor belt, the development voltage of the electroreceptor 1 can be increased.

The electroreceptor belt 2 may be supported by another roller or drum (not shown) which allows the electroreceptor belt to be continuously cycled for multiple charging/imaging and development steps.

The electroreceptor belt 2 may comprise any suitable dielectric material such as an inorganic or organic polymeric material. The material is preferably an electrically resistive dielectric material. Such materials may comprise, for example, Mylar, a commercially available polymer, polyurethanes, polyesters, fluorocarbons and polycarbonates. The belt may have a thickness between about 5 micrometers and about 50 micrometers, preferably about 10 micrometers to about 20 micrometers depending upon various considerations, namely image resolution requirements, but also desired flexibility, economical considerations, and the particular material used for the belt. In general, the thickness of the receptor is preferably a fraction of the line width, i.e., approximately the pixel size. Pixel size is meant to refer to a charged area of microscopic dimension. For a 600 spot per inch (spi) resolution, the receptor thickness is preferably between about 20 micrometers and 40 micrometers.

The roller or drum 3 may comprise any suitable material, provided that at least a portion of the roller or drum 3 is conductive. The roller 3 may comprise Mylar in combination with a layer of conductive organic or inorganic material, such as indium tin oxide or aluminum. Other conductive materials include metals, for example, aluminum, chromium, nickel, brass and the like.

The spacer means 4 having the conductive surface 5 may comprise an insulating dielectric material which may be the same as or different from the material used for the electroreceptor belt, provided the objectives of the present invention are obtained. Further, the conductive surface 5 may comprise any suitable conductive material, for example, any of the materials described above as suitable for the conductive roller or drum 3.

It may be preferable to provide a taper at one end of the spacer means to allow for the distance between the outer surface of the spacer means and the conductive back electrode to be gradually increased. A maximum thickness of the spacer means 4 (not including the thickness of the conductive surface 5) is preferably in the range of from about 10 micrometers to about 100 micrometers preferably from about 20 micrometers to about 50 micrometers. Thicknesses outside the above range may be used, provided the objectives of the invention are obtained. The thickness of the conductive surface 5 is not critical, but typically exceeds 0.1 micrometer.

The following is a brief description of the charging and developing of the above-described electroreceptor 1. As the electroreceptor belt 2 is cycled around the conductive roller or drum 3, a latent electrostatic image is applied to the outer surface of the belt, for example, at position 6. In a simple form of imaging, latent images are formed by depositing ions in a prescribed pattern onto the electroreceptor belt surface with a linear array of ion emitting devices or with an ion head. Electrostatic images of sufficient electric field and potential are created and retained at the surface of the electroreceptor at position 6. The latent image may be formed by applying a surface charge density on the receiver surface of from about 10 to about 100 nano-Coulombs per square centimeter. These electrostatic patterns are suitable for development with toner and developer compositions. Charged toner particles are passed over the latent image, causing the toner particles to remain in charged portions.

Development occurs at, for example, position 7. During development, the distance between the electroreceptor belt surface and the conductive surface of the drum 3 has been increased because of the spacer means 4. Increased voltage is obtained for development, and the developed image is then transferred and permanently affixed to a substrate such as paper.

As mentioned above, the present invention is also directed to electrophotographic imaging members. In electrophotography, image blooming generally is not a problem, but other problems are present instead. To obtain high development voltages one has to charge photoreceptors to a high field or use thick photoreceptors. Charging photoreceptors to a high internal field has the problem that localized electrical breakdown may occur, causing print defects. Thick photoreceptors have the problem of not being sufficiently flexible, resulting in cracking. The present invention allows high development voltages to be obtained with thin, flexible receptors. In such an embodiment, an electrophotographic flexible imaging belt is provided in place of the electroreceptor belt 2 described above. An electrophotoconductive belt of the present invention may be provided in a number of forms. For example, the electrophotographic belt may be a flexible multilayered belt.

Figure 2:
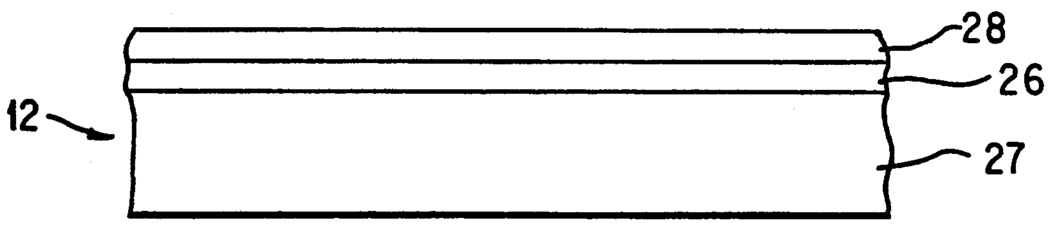
FIG. 2 is a cross-sectional view of an electrophotographic belt used in the embodiment as a photoreceptor as the invention.

Representative structure of an electrophotographic imaging belt 12 of the present invention is shown in FIG. 2. The electrophotographic imaging device is similar to the electroreceptor device 1 shown in FIG. 1 and comprises an electrophotographic belt 12, a conductive roller or drum, and a dielectric spacer means having a conductive surface. Referring to FIG. 2, the belt 12 comprises a charge generating layer 26, a charge transport layer 27 and an optional overcoating layer 28. A belt for use in this embodiment generally must comprise at least a charge generating layer and a charge transport layer.

In the electrophotographic embodiment, the roller or drum has a conductive surface. This roller or drum may be formed of generally any material described above as suitable for the roller or drum 3 for an electroreceptor.

A spacer means having a conductive back surface 15 is provided as in the embodiment described in FIG. 1. The spacer means comprises a mechanically suitable dielectric material. The conductive surface may be formed of generally any conductive material, such as those materials described above as being suitable for the conductive surface 5 in an electroreceptor.

Imaging and development of the latent image is carried out by uniformly charging the electrophotoconductive belt and forming a latent image. In particular, the electrophotographic belt is imaged by first uniformly electrostatically charging its surface. The belt is then exposed to a pattern of activating electromagnetic radiation, e.g., light. The radiation selectively dissipates the charge in the illuminated area of the photoconductive insulating layer, leaving behind an electrostatic latent image in the non-illuminated areas. These charging/imaging steps take place, for example, at a position comparable to position 6 shown in FIG. 1, when the distance between the outer surface of the electrophotograhic belt and the conductive surface of the drum is at a minimum. This electrostatic latent image may then be developed, for example at a position comparable to position 7 shown in FIG. 1, to form a visible image by depositing finely divided electroscopic marking particles on the surface of the photoconductive insulating layer. The resulting visible image may then be transferred from the electrophotographic belt to a support such as paper.

A description of the layers of the electrophotographic imaging member shown in FIG. 2 follows.

The Charge Generating Layer

Any suitable charge generating (photogenerating) layer 26 may be applied. Examples of materials for photogenerating layers include inorganic photoconductive particles such as amorphous selenium, trigonal selenium, and selenium alloys selected from the group consisting of selenium-tellurium, selenium-tellurium-arsenic, selenium arsenide and phthalocyanine pigment such as the X-form of metal-free phthalocyanine described in U.S. Pat. No. 3,357,989, metal phthalocyanines such as vanadyl phthalocyanine and copper phthalocyanine, dibromoanthanthrone, squarylium, quinacridones available from du Pont under the tradename Monastral Red, Monastral Violet and Monastral Red Y, Vat orange 1 and Vat orange 3 (trade names for dibromo anthanthrone pigments), benzimidazole perylene, substituted 2,4-diaminotriazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like, dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639. Other suitable photogenerating materials known in the art may also be utilized, if desired. Charge generating layers comprising a photoconductive material such as vanadyl phthalocyanine, metal-free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal-free phthalocyanine and tellurium alloys are also preferred because these materials provide the additional benefit of being sensitive to infra-red light.

Any suitable polymeric film-forming binder material may be employed as the matrix in the photogenerating layer. Typical polymeric film-forming materials include those described, for example, in U.S. Pat. No. 3,121,006. The binder polymer should adhere well to the adhesive layer, dissolve in a solvent which also dissolves the upper surface of the adhesive layer and be miscible with the adhesive layer to form a polymer blend zone. Typical solvents include tetrahydrofuran, cyclohexanone, methylene chloride, 1,1,1-trichloroethane, 1,1,2-trichloroethane, trichloroethylene, toluene, and the like, and mixtures thereof. Mixtures of solvents may be utilized to control evaporation range. For example, satisfactory results may be achieved with a tetrahydrofuran to toluene ratio of between about 90:10 and about 10:90 by weight. Generally, the combination of photogenerating pigment, binder polymer and solvent should form uniform dispersions of the photogenerating pigment in the charge-generating layer coating composition. Typical combinations include polyvinylcarbazole, trigonal selenium and tetrahydrofuran; phenoxy resin, trigonal selenium and toluene; and polycarbonate resin, vanadyl phthalocyanine and methylene chloride. The solvent for the charge generating layer binder polymer should dissolve the polymer binder utilized in the charge generating layer and be capable of dispersing the photogenerating pigment particles present in the charge generating layer.

The photogenerating composition or pigment may be present in the resinous binder composition in any of various amounts. Generally, from about 5 percent by volume to about 90 percent by volume of the photogenerating pigment is dispersed in about 95 percent by volume to about 10 percent by volume of the resinous binder. Preferably from about 20 percent by volume to about 30 percent by volume of the photogenerating pigment is dispersed in about 70 percent by volume to about 80 percent by volume of the resinous binder composition. In one embodiment, about 8 percent by volume of the photogenerating pigment is dispersed in about 92 percent by volume of the resinous binder composition.

The photogenerating layer generally ranges in thickness from about 0.1 micrometer to about 5.0 micrometers, preferably from about 0.3 micrometer to about 3 micrometers. The desired photogenerating layer thickness generally depends on binder content. Higher binder content compositions generally require thicker layers for photogeneration. Thicknesses outside these ranges can be selected, provided the objectives of the present invention are achieved.

Any suitable technique may be utilized to mix and thereafter apply the photogenerating layer coating mixture to the previously dried adhesive layer. Typical application techniques include spraying, dip coating, roll coating, wire wound rod coating, and the like. Drying of the deposited coating may be effected by any suitable conventional technique such as oven drying, infrared radiation drying, air drying and the like, to remove substantially all of the solvents utilized in applying the coating.

The Charge Transport Layer

The charge transport layer 27 may comprise any suitable transparent organic polymer or non-polymeric material capable of supporting the injection of photogenerated holes or electrons from the charge generating layer 26 and allowing the transport of these holes or electrons through the organic layer to selectively discharge the surface charge. The charge transport layer should exhibit negligible, if any, discharge when exposed to a wavelength of light useful in xerography, e.g. 4000 Angstroms to 9000 Angstroms. The charge transport layer is normally transparent in a wavelength region in which the photoconductor is to be used when exposure is effected therethrough to ensure that most of the incident radiation is utilized by the underlying charge-generating layer. The charge transport layer in conjunction with the charge-generating layer is an insulator to the extent that an electrostatic charge placed on the charge transport layer is not conducted in the absence of illumination.

The charge transport layer may comprise activating compounds or charge transport molecules dispersed in normally electrically inactive film-forming polymeric materials for making these materials electrically active. These charge transport molecules may be added to polymeric materials which are incapable of supporting the injection of photogenerated holes and incapable of allowing the transport of these holes. An especially preferred transport layer employed in multilayer photoconductors comprises from about 25 percent to about 75 percent by weight of at least one charge-transporting aromatic amine, and about 75 percent to about 25 percent by weight of a polymeric film-forming resin in which the aromatic amine is soluble.

The charge transport layer is preferably formed from a mixture comprising at least one aromatic amine compound of the formula:

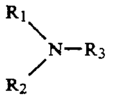

wherein $R_1$ and $R_2$ are each an aromatic group selected from the group consisting of a substituted or unsubstituted phenyl group, naphthyl group, and polyphenyl group and $R_3$ is selected from the group consisting of a substituted or unsubstituted aryl group, an alkyl group having from 1 to 18 carbon atoms and a cycloaliphatic group having from 3 to 18 carbon atoms. The substituents should be free from electron-withdrawing groups such as $NO_2$ groups, CN groups, and the like. Typical aromatic amine compounds that are represented by this structural formula include:

I. Triphenyl amines such as:

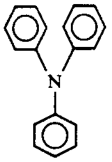

II. Bis and poly triarylamines such as:

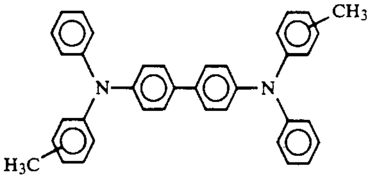

III. Bis arylamine ethers such as:

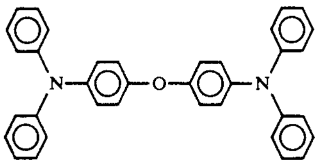

and

IV. Bis alkyl-arylamines such as:

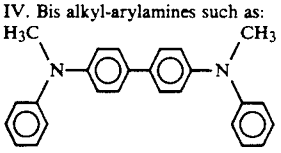

A preferred aromatic amine compound has the general formula:

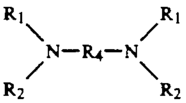

wherein $R_1$ and $R_2$ are defined above, and $R_4$ is selected from the group consisting of a substituted or unsubstituted biphenyl group, a diphenyl ether group, an alkyl group having from 1 to 18 carbon atoms, and a cycloaliphatic group having from 3 to 12 carbon atoms. The substituents should be free from electron-withdrawing groups such as $NO_2$ groups, CN groups, and the like.

Examples of charge-transporting aromatic amines represented by the structural formulae above include triphenylmethane, bis(4-diethylamine-2-methylphenyl)-phenylmethane; 4'-4"-bis(diethylamino) -2',2"-dimethyltriphenylmethane; N,N'-bis(alkylphenyl)-(1,1'-biphenyl)-4,4'-diamine wherein the alkyl is, for example, methyl, ethyl, propyl, n-butyl, etc.; N,N'-diphenyl-N,N'-bis(3"-methylphenyl)-(1,1'biphenyl)-4,4'-diamine; and the like, dispersed in an inactive resin binder.

Any suitable inactive resin binder soluble in methylene chloride or other suitable solvents may be employed. Typical inactive resin binders soluble in methylene chloride include polycarbonate resin, polyvinylcarbazole, polyester, polyarylate, polyacrylate, polyether, polysulfone, and the like. Molecular weights can vary from about 20,000 to about 1,500,000. Other solvents that may dissolve these binders include tetrahydrofuran, toluene, trichloroethylene, 1,1,2-trichloroethane, 1,1,1-trichloroethane, and the like.

The preferred electrically inactive resin materials are polycarbonate resins having a molecular weight from about 20,000 to about 120,000, more preferably from about 50,000 to about 100,000. The materials most preferred as the electrically inactive resin material are poly(4,4'-dipropylidene-diphenylene carbonate) with a molecular weight of from about 35,000 to about 40,000, available as Lexan 145 from General Electric Company; poly(4,4'-isopropylidene-diphenylene carbonate) with a molecular weight of from about 40,000 to about 45,000, available as Lexan 141 from General Electric Company; a polycarbonate resin having a molecular weight of from about 50,000 to about 100,000, available as Makrolon from Farbenfabricken Bayer A.G.; a polycarbonate resin having a molecular weight of from about 20,000 to about 50,000, available as Merlon from Mobay Chemical Company; polyether carbonates; and 4,4'-cyclohexylidene diphenyl polycarbonate. Methylene chloride solvent is a desirable component of the charge transport layer coating mixture for adequate dissolving of all the components and for its low boiling point.

An especially preferred multilayered photoconductor comprises a charge-generating layer comprising a binder layer of photoconductive material and a contiguous hole transport layer of a polycarbonate resin material having a molecular weight of from about 20,000 to about 120,000, having dispersed therein from about 25 to about 75 percent by weight of one or more compounds having the formula:

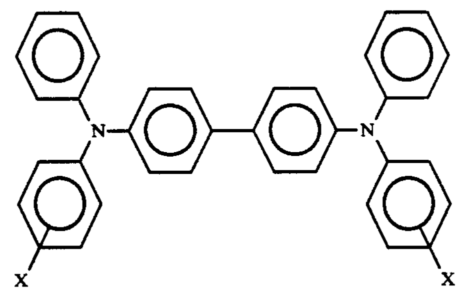

wherein X is selected from the group consisting of an alkyl group, having from 1 to about 4 carbon atoms, and chlorine, the photoconductive layer exhibiting the capability of photogeneration of holes and injection of the holes, the hole transport layer being substantially non-absorbing in the spectral region at which the photoconductive layer generates and injects photogenerated holes but being capable of supporting the injection of photogenerated holes from the photoconductive layer and transporting the holes through the hole transport layer.

The thickness of the charge transport layer is preferably within the range of from about 10 micrometers to about 50 micrometers, and preferably from about 20 micrometers to about 35 micrometers.

The Overcoating Layer

The optional overcoating layer 28 may comprise organic polymers or inorganic polymers that are electrically insulating or slightly semi-conductive. The thickness of the overcoating layer is preferably within the range of from about 2 micrometers to about 8 micrometers, preferably from about 3 micrometers to about 6 micrometers. An optimum range of thickness is typically from about 3 micrometers to about 5 micrometers.

While the invention has been described with reference to flexible belts supported by conductive rollers, the invention is not limited to the specific embodiments described herein. In particular, the present invention covers embodiments wherein a variable thickness can be provided between the outside surface of an insulating layer functioning as a counterelectrode and a conductive layer functioning as a back electrode.

Although the invention has been described with reference to specific preferred embodiments, it should not be construed as being limited thereto. Rather, those skilled in the art will recognize that variations and modifications may be made therein which are within the spirit of the invention and within the scope of the claims.

What is claimed is:

1. An imaging device, comprising:

dielectric means for receiving a charge: pl conductive means for attracting said charge, said conductive means having a first conductive part and a second conductive part; and spacer means for insuring that at a first position, a distance form an outer surface of said dielectric means to said first conductive part is different from a distance form said outer surface of said dielectric means to said second conductive part at a second position.

2. The imaging device recited in claim 1, wherein said dielectric means comprises a flexible endless belt.

3. The imaging device recited in claim 1, wherein said first conductive part comprises a rotatable drum, around which said dielectric means is positioned.

4. The imaging device recited in claim 3, wherein said spacer means comprises a dielectric article, one surface of which is adjacent to said dielectric means, another surface of which is adjacent to said second conductive part.

5. The imaging device recited in claim 1, wherein said dielectric means comprises at least one dielectric material selected from the group consisting of polyurethanes, polyesters, fluorocarbons and polycarbonates.

6. The imaging device recited in claim 1, wherein said dielectric means is of a thickness from about 5 micrometers to about 50 micrometers.

7. The imaging device recited in claim 1, wherein said spacer means is of a thickness from about 10 micrometers to about 100 micrometers.

8. The imaging device recited in claim 1, wherein said dielectric means comprises a substrate of a photoreceptor, said photoreceptor comprising said substrate, a charge transport layer and a charge generating layer.

9. The imaging device recited in claim 1, wherein said imaging device is an ionographic imaging device.

10. An imaging device comprising:

a dielectric article having a first portion and a second portion;

a conductive article having (1) a first conductive means for providing an image-forming back electrode for said first portion of said dielectric article and (2) a second conductive means for providing a counter-electrode for developing a latent electrostatic image on said second portion of said dielectric article; and spacer means for insuring that a distance from an outer surface of said second portion of said dielectric article to said second conductive means is larger than a distance from an outer surface of said first portion of said dielectric article to said first conductive means.

11. The imaging device recited in claim 10, wherein said first portion of said dielectric article and said second portion of said dielectric article together comprise an endless flexible belt.

12. The imaging device recited in claim 10, wherein said first conductive means comprises a rotatable drum around which said first portion of said dielectric article is positioned.

13. The imaging device recited in claim 10, wherein said spacer means comprises a dielectric piece, one surface of which is adjacent to said second portion of said dielectric article, another surface of which is adjacent to said second conductive means.

14. The imaging device recited in claim 10, wherein said dielectric article and said spacer means each comprise at least one dielectric material selected from the group consisting of polyurethanes, polyesters, fluorocarbons and polycarbonates.

15. The imaging device recited in claim 10, wherein said dielectric article is of a thickness from about 5 micrometers to about 50 micrometers and said spacer means is of a thickness from about 100 micrometers to about 1000 micrometers.

16. The imaging device recited in claim 10, wherein said dielectric article comprises a photoreceptor, said photoreceptor comprising a charge transport layer and a charge generating layer.

17. The imaging device recited in claim 10, wherein said imaging device is an ionographic imaging device.

18. An imaging device comprising:

a dielectric article having a first portion and a second portion;

a conductive article having (1) a first conductive means for providing an image-forming back electrode for said first portion of said dielectric article and (2) a second conductive means for providing a counter-electrode for developing a latent electrostatic image on said second portion of said dielectric article;

spacer means for insuring that a distance from an outer surface of said second portion of said dielectric article to said second conductive means is larger than a distance from an outer surface of said first portion of said dielectric article to said first conductive means;

an image-forming means for forming a latent electrostatic image on said first portion of said dielectric article; and a developing means for developing said latent electrostatic image on said second portion of said dielectric article.

19. The imaging device recited in claim 18, wherein said first portion of said dielectric article and said second portion of said dielectric article together comprise a flexible endless belt.

20. The imaging device recited in claim 19, wherein said dielectric article comprises a photoreceptor, said photoreceptor comprising a charge transport layer and a charge generating layer.

21. A method for developing an image, comprising:

forming a latent image on a surface of a charge receiver, said surface being a predetermined distance from a conductive surface;

increasing said distance; and developing said latent image.

22. The method recited in claim 21, wherein said charge receiver is a flexible endless belt comprising a dielectric material.

23. The method recited in claim 22, wherein said flexible endless belt is moved such that it passes around a rotatable conductive drum and over a spacer comprising a dielectric substance, the spacer being adjacent a conductive article, where said predetermined distance being measured from a surface of said dielectric material to said rotatable conductive drum and said increased distance being measured from a surface of said dielectric material to a surface of said conductive article.

24. The method of claim 21, wherein said latent image is formed by electrostatically charging said surface of said charge receiver.

25. The method of claim 21, wherein said latent image is formed in a step comprising applying a surface charge density on said charge receiver of from about 10 $nC/cm^2$ to about 100 $nC/cm^2$.

* * * * *